United States Patent

Izutani et al.

[11] Patent Number: 5,900,148
[45] Date of Patent: *May 4, 1999

[54] FUEL FILTER AND PUMP ASSEMBLY

[75] Inventors: Kouji Izutani, Nagoya; Kingo Okada; Takayuki Nakaya, both of Kariya; Katsuhisa Yamada, Okazaki, all of Japan

[73] Assignee: Nippondenso Co., Ltd., Kariya, Japan

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/668,476

[22] Filed: Jun. 25, 1996

Related U.S. Application Data

[63] Continuation of application No. PCT/JP95/02242, Nov. 2, 1995.

[30] Foreign Application Priority Data

Feb. 3, 1995 [JP] Japan .................... 7-017308

[51] Int. Cl.$^6$ .................................................. B01D 35/26
[52] U.S. Cl. ...................... 210/416.4; 210/435; 210/492; 210/493.1; 210/497.01
[58] Field of Search ................... 210/416.4, 484, 210/493.1, 493.2, 493.3, 493.4, 494.1, 494.3, 497.01, 497.1, 497.2, 446, 447, 448, 496, 487, 492, 493.5, 435; 55/521

[56] References Cited

U.S. PATENT DOCUMENTS

| | | |
|---|---|---|
| 759,903 | 5/1904 | Moeckel ................... 210/447 |
| 3,025,963 | 3/1962 | Bauer ...................... 210/493.4 |
| 3,288,299 | 11/1966 | Paton et al. . |
| 3,716,970 | 2/1973 | Stupf et al. ............... 55/521 |
| 3,870,495 | 3/1975 | Dixson et al. ............ 55/521 |
| 4,439,321 | 3/1984 | Taki et al. ............. 210/493.5 |
| 4,697,632 | 10/1987 | Lirones .................... 210/496 |
| 5,076,920 | 12/1991 | Danowski et al. . |
| 5,078,167 | 1/1992 | Brandt et al. . |
| 5,195,494 | 3/1993 | Tuckey . |
| 5,279,731 | 1/1994 | Cook et al. ............ 210/493.5 |
| 5,392,750 | 2/1995 | Laue et al. . |
| 5,562,825 | 10/1996 | Yamada et al. ....... 210/493.4 |
| 5,782,223 | 7/1998 | Yamashita et al. . |

FOREIGN PATENT DOCUMENTS

| | | |
|---|---|---|
| 0630672 | 12/1994 | European Pat. Off. . |
| 53-35267 | 4/1978 | Japan ........................ 55/521 |
| A-58-27609 | 2/1983 | Japan . |
| 59-142818 | 8/1984 | Japan ................... 210/493.3 |
| 59-184919 U | 8/1984 | Japan . |
| 184919 | 12/1984 | Japan . |
| B2-60-56523 | 12/1985 | Japan . |
| Y2-62-7368 | 2/1987 | Japan . |
| A-2-191862 | 7/1990 | Japan . |
| 2-127766 U | 10/1990 | Japan . |
| 3-108853 U | 11/1991 | Japan . |

*Primary Examiner*—Matthew O. Savage
*Attorney, Agent, or Firm*—Nixon & Vanderhye P.C.

[57] ABSTRACT

A cover for covering an opening of a fuel tank holds a fuel pump, a fuel filter, a fuel level gauge and a pressure regulator inside the fuel tank. The fuel filter is contained inside a filter housing having a C-shaped cross-section. A filter element also has a C-shaped cross-section. This type of filter element is formed by bending flat stacked pre-assembled bodies into a C-shape. Other components such as the fuel level gauge, a fuel passage and the like are placed in an open part of the C-shaped cross-section and thus, the fuel filter and the other components are integrated in a high density.

30 Claims, 6 Drawing Sheets

5,900,148

FUEL FILTER AND PUMP ASSEMBLY

This application is a continuation of PCT/JP95/02242 filed Nov. 2, 1995.

TECHNICAL FIELD OF THE INVENTION

The present invention relates to a filter which, for example, is used for filtering fuel supplied from a fuel tank to a fuel consumption device such as an internal combustion engine.

BACKGROUND ART

A well known conventional filter for filtering fuel supplied to internal combustion engines contains an element inside a cylindrical housing. However, there is a need to provide a circular stay for installing such a conventional cylindrical filter. In addition, when a cylindrical fuel filter is installed on a vehicular body, the filter tends to greatly protrude from a surface where it is installed.

Accordingly, one prior proposal installs the fuel filter inside a fuel tank. For example, U.S. Pat. No. 5,392,750 discloses a ring-shaped fuel filter whose shape enables it to be installed on an outer periphery of a fuel pump.

However, one problem with the construction according to U.S. Pat. No. 5,392,750 is the enlargement of the diameter of the filter because it has to be installed on the outer periphery of the fuel pump.

SUMMARY OF THE INVENTION

In view of the problem in the prior art described above, one object of the present invention is to provide an improved filter.

The present invention aims to provide a filter having a novel shape, and a method for manufacturing the same.

The present invention aims to enhance the flexibility in handling and installing a fuel filter.

The present invention aims to provide a filter having a discontinuous part along its periphery.

The present invention aims to provide a filter having a substantially cylindrical shape with a discontinuous part along its periphery.

The present invention aims to provide a filter that is ideal for use particularly as a fuel filter.

The above-described objectives of the present invention can be achieved by forming a discontinuous part at the outer peripheral surface of a filter element having the outer peripheral surface and both liquid entrance and exit end surfaces. Because the filter has the discontinuous part at a portion of its outer periphery, such discontinuous part can be used accordingly.

It must be noted here that the discontinuous part can be a concavity formed at one part of the outer peripheral surface of the filter element.

Also, the discontinuous part can also be an opening formed at one part of the outer peripheral surface of the filter element.

The filter can be formed to have a C-shape. The opening can also be fashioned to be the opening of the C-shape.

It must be noted here that the above-described filter is suitable for use as a fuel filter for filtering fuel.

As for the method of manufacturing the filter for filtering liquids, the above-mentioned objectives of the present invention can be achieved by employing a manufacturing method which includes a first step of forming a belt-like body which includes filter material, a second step of stacking filter material to form a pre-assembled body, and a third step of forming the filter element by mechanically processing the pre-assembled body. Thus, a filter having a shape not bound by the restriction of stacking the belt-like body can be provided.

It must be noted here that it is desirable for the belt-shaped body to have a plurality of filter pipes.

Also, in the third step, it is desirable that the filter element having a discontinuous part at its outer periphery be formed by mechanically processing the pre-assembled body. Thus, the discontinuous part can be used accordingly.

In addition, in the second step, the filter material can be stacked to form a hollow, tubular pre-assembled body, and thus, in the third step, the filter element can be formed by applying a mechanical process which changes the form of the pre-assembled body. Moreover, for the third step, the filter element may be formed by applying a mechanical process which cuts off at least one part of the tubular pre-assembled body.

Also, in the second step, the filter material can be stacked to form a board-shaped pre-assembled body. For this case, in the third step, the board-shaped pre-assembled body undergoes a mechanical process that changes its shape so that the filter element is formed.

Also, in the third step, the pre-assembled body can be installed inside a filter housing, which has a discontinuous part in its peripheral direction, while changing its shape.

The above-mentioned objectives of the present invention can be achieved by employing a method for manufacturing a filter, which is used for filtering liquids, that includes a step for fashioning the filter material into a tube and a step for forming the filter element which has a discontinuous part at its outer periphery by mechanically processing the tubular filter material.

The above-mentioned objectives of the present invention can be achieved by employing a method for manufacturing a filter, which is used for filtering liquids, that includes a step for placing the filter material to a first thickness at one portion in the peripheral direction, and a step for placing the filter material at a second thickness thinner than the first thickness at the remaining portion in the peripheral direction so that a concavity is formed at the part having the second thickness.

DETAILED DESCRIPTION OF EXEMPLARY EMBODIMENTS

Embodiments of the present invention are described with reference to the drawings.

First Embodiment

The present embodiment is an application of the present invention as a fuel filter.

Figure 1:
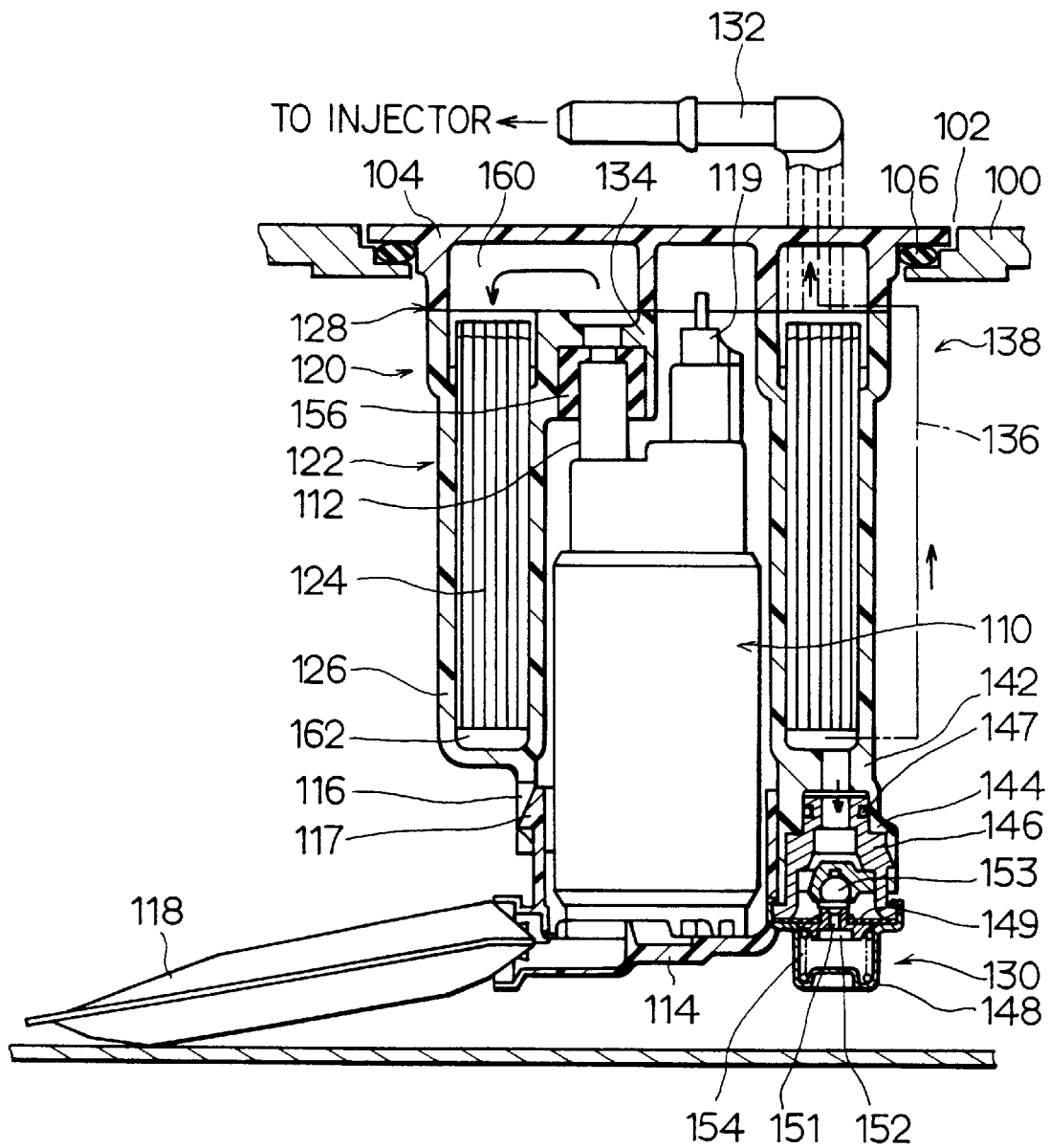
FIG. 1 is a longitudinal cross-sectional view of a first embodiment of the present invention.
Figure 2:
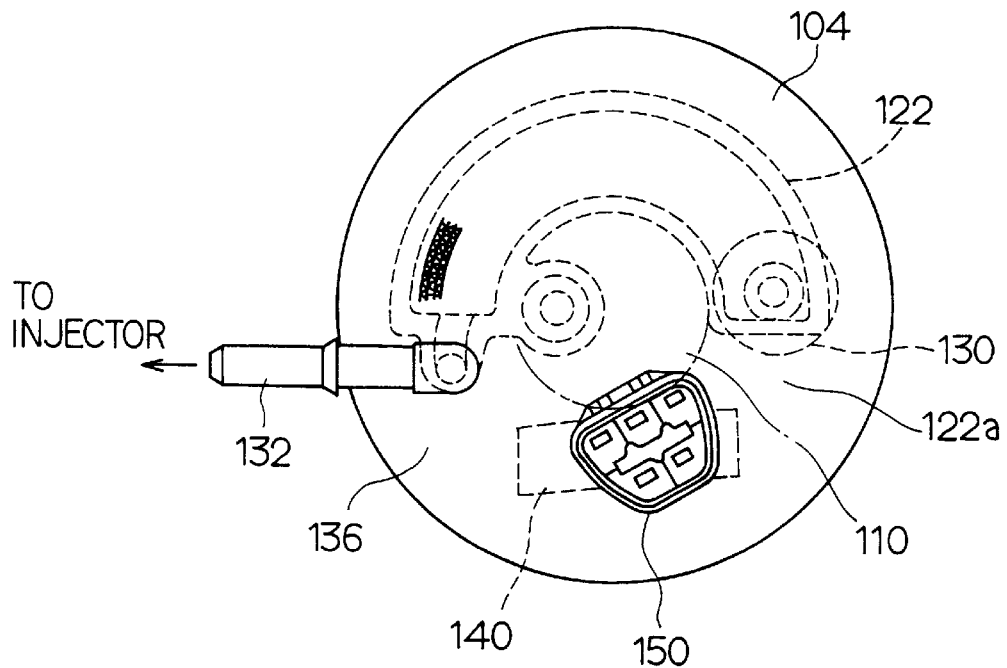
FIG. 2 is a plan view of an upper end of the first embodiment.

FIG. 1 is a longitudinal cross-sectional view of the first embodiment while FIG. 2 shows a plan view as seen from an upper part of the first embodiment.

In the present embodiment, as fuel supply functional components, a fuel pump 110, a fuel filter 120, a pressure regulator 130, a fuel level gauge 140, an electrical connector 150 and a fuel pipe 132 are installed and integrated as one unit in a cover 104 which covers an opening 102 of a fuel tank 100.

The opening 102 is formed in the fuel tank 100 which is either made of metal or of resin. The electrically insulating resin cover 104 is provided to cover the opening 102. A gasket 106 for sealing is installed between this cover 104 and the fuel tank 100.

The fuel filter 120 is formed to contain a filter element 124 inside its housing 122. Moreover, the cover 104 is part of the housing 122 and the housing 122 is suspended from the cover 104.

The filter paper of the element 124 is mainly made of fibers having high affinities with the fuel to be filtered. Such fibers, for example, include glass fibers which have high affinities with water. Accordingly, water mixed inside the fuel sticks to the glass fibers to form water droplets and because water becomes easily separable from the fuel, water flows down to a bottom part of the housing 122.

The filter housing 122 includes the cover 104 which is the upper housing and the lower housing 126. The lower housing 126 is electrically conductive since it is made from resin material that is mixed with conductive material such as carbonic fibers, carbonic powder or the like. At a boundary part 128, the upper housing 104 and the lower housing 126 are welded liquid-tightly.

As shown in FIG. 2, the housing 122 is not perfectly circular in shape but is in an imperfect circular shape having a cut-out space part 122a which extends over approximately 90° to have a C-shaped cross-section. The upper housing 104, which is made up of an electrically non-conductive resin, includes discharge pipe 132 which is integrated with it. The lower housing 126 has a fixed cup part having a C-shaped cross-section to contain and fix the element 124.

The housing 122 of the fuel filter 120 is provided with one fuel inlet and two fuel outlets. Input pipe 134 which acts as the fuel inlet is provided in an upper inner peripheral side of the housing 122 and is connected to a discharge pipe 112 of the fuel pump 110. A pipe 136, which forms a first fuel outlet among two fuel outlets, upwardly extends along the axial direction from a lower end of the lower housing 126. The pipe 136 is integrally formed to be adjacent to the cup-portion of the lower housing 126 and positioned in the cut-out space part 122a. The pipe 136 communicates with the discharge pipe 132 provided on the cover 104 and forms a fuel route 138 for supplying filtered fuel to an injector. A return pipe 142 which forms a second fuel outlet is provided at a lower part of lower housing 126 and is connected to the pressure regulator 130. It is vital that the return pipe 142 opens to the lower end part of the lower housing 126.

The pressure regulator 130 is fitted into and fixedly engaged with a tubular part 144 which extends from a bottom part of the lower housing 126. An O-ring 147 is provided between a body 146 and the tubular part 144 with a claw of the body 146 being detachably snap-fitted into a hole of the tubular part 144. Accordingly, the pressure regulator 130 can be easily removed from the filter housing 122 by removing the body 146 from the tubular part 144. A diaphragm 149 is sandwiched between an opening end of the body 146 and a housing 148. This diaphragm 149 supports a movable valve seat 152 which is provided with a discharge passage 151. A fixed valve body 153 which cooperates with the valve seat 152 is fixed inside the body 146. A compressed coil spring 154 is contained between the housing 148 and the diaphragm 149. The housing 148 has a hole (not shown in the drawing) for setting the spring chamber pressure to atmospheric pressure or tank internal pressure and for emitting fuel from the discharge passage 151.

In the pressure regulator 130, when a fuel pressure inside the body 146 exceeds a predetermined spring pressure, the diaphragm 149 moves to the spring chamber side to open the discharge passage 151 of the movable valve seat 152 and return fuel inside the body 146 to the fuel tank 100. Accordingly, the pressure of fuel discharged from the fuel pump 110 and supplied from the fuel filter 120 to the injector can be maintained at a predetermined pressure.

While the claw of the body 146 is snapped to the hole of the tubular part 144 to insert the pressure regulator 130 in the present embodiment, a stay can be extended from the pump holder 114 with the body 146 being simply inserted into the tubular part 144 so that the housing 148 of the pressure regulator 130 can be supported by the stay which extends from the pump holder 114.

The internal periphery of the C-shaped ring-like filter housing 122 houses the fuel pump 110. The fuel pump 110 is supported at its lower side by a cup-shaped pump holder 114. A plurality of holes 116 is formed in the peripheral direction of a skirt part which extends in the lower inner peripheral side of the filter housing 122, so that claws 117 of the pump holder 114 may be engaged. Accordingly, the fuel pump 110 is detachably installed in the filter housing 122. The fuel discharge pipe 112 protrudes from an upper part of the fuel pump 110. This fuel discharge pipe 112 is connected to the inlet pipe 134 via gasket 156. Moreover, the pump holder 114 is attached with a net-shaped resin filter 118. The pump holder 114 is so constructed that a suction opening provided at the lower part of the fuel pump 110 communicates with the inner side of the filter 118 when the pump holder 114 is fitted to the lower side of the fuel pump 110. It must be noted here that in the same way as the conventional fuel pump, a check valve is contained inside the discharge pipe 112 for maintaining the fuel residual pressure inside the pipe when the fuel pump 110 is at a stop.

Meanwhile, the fuel level gauge 140 is provided in the space portion 122a of the housing 122 of the fuel filter 120. A float (not shown in the drawing) extends from this fuel level gauge 140 for providing a resistance value which corresponds to the fuel level.

The electrical connector 150 is formed to be integrated with the cover 104 by insert-molding a plurality of terminal pins directly inserted into the non-conducting material of the cover 104. It must be noted here that a sealant is applied on the outer periphery of the terminal pins to maintain sealing from the resin material. Also, the terminal pins undergo a process for preventing fall-out. As shown in FIG. 2, the electrical connector 150 is disposed so that it does not overlap with the fuel filter 120. The terminal pins of this electrical connector 150 are connected to an electrical power source and a controller outside of the fuel tank. Also, in the interior of the fuel tank, this electrical connector 150 is connected to the electrical connection part 119 of the fuel pump 110 via lead lines not shown in the drawing to supply electric power to the motor, and is connected to the fuel level gauge 140 via lead lines which are not shown in the drawings to transmit electrical signals which indicate the fuel level.

In this way, in the present embodiment, the filter is placed along a partial angular range of the outer periphery of the fuel pump 110 with functional components such as the fuel pipe 132, the electrical connector 150 and the fuel level gauge 140 being placed in the rest of the angular range of the outer periphery of the fuel pump 110.

Fuel flow is described hereinafter.

When electric power is supplied to the fuel pump 110 via the electrical connectors 150, 119, the fuel pump 110 takes in fuel via the filter 118 and discharges fuel from the discharge pipe 112. The fuel flows in route 160 between the lower housing 126 and the upper housing 104 in the direction of the arrow. This fuel flows downward inside the housing 122 and is filtered en route by the element 124. A part of the fuel which has reached the lower space 162 of the housing 122 after passing through the element 124 is returned back to the inside of the fuel tank 100 by the pressure regulator 130 for adjusting the fuel pressure, while the remainder passes through the pipes 136, 132 and is supplied to the injector of the fuel injection device which is installed on the engine. According to the present embodiment, return fuel only circulates inside the fuel tank 100 with no return fuel coming from the engine.

Static electricity is produced when the fuel rubs hard against the element 124. Because the lower housing 126 is made up of conductive resin, static electricity is discharged to the outside of the lower housing 126 without ever being stored inside the housing. An area for discharging the static electricity is increased by making the metallic component being electrically floated inside the fuel tank contact the lower housing 126 and thus, the stored level of static electricity is further reduced. For example, the area for discharging electricity is increased by making a metallic case of the fuel pump 110, whose electric power terminals are both insulated, contact the lower housing 126 and therefore, static electricity can be reduced only within the fuel tank.

It must be noted here that while there is a need to provide a special electrical connection structure, static electricity can also be released by connecting the lower housing 126 to a ground electrode inside the electrical connector 150.

The manufacturing method and the shape of the filter element 124 of the above-described embodiment is explained hereinafter.

Figure 3:
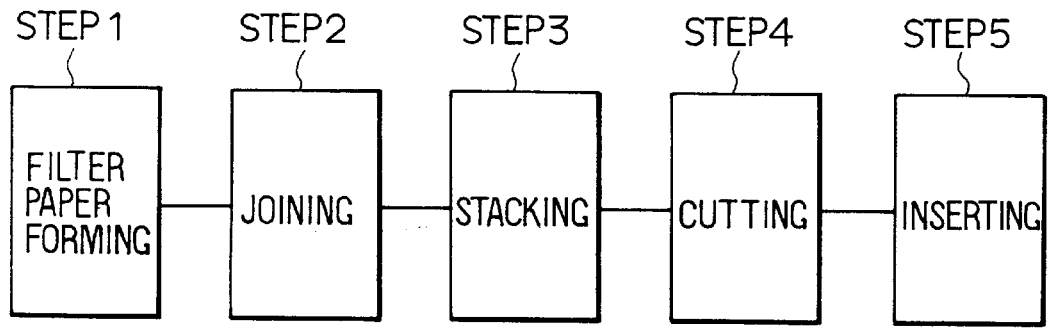
FIG. 3 is a flowchart of a manufacturing process of a filter element.

The element 124 is manufactured by processing two filter papers in accordance with the processing procedure shown in FIG. 3.

First, filter papers are formed in step 1. Here, two belt-shaped filter papers are provided with one paper being processed to have wave-like form that has alternating semi-circular mountains and steep ravines.

Figure 4:
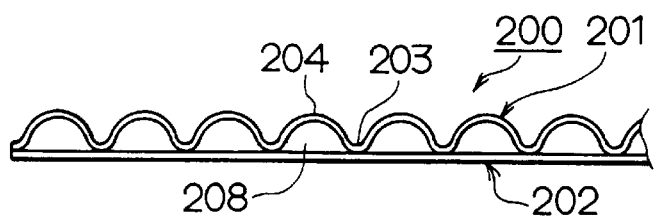
FIG. 4 is an enlarged view of a belt-like body which is part of a pre-assembled body of the filter element.

Next, in step 2, the two belt-shaped filter papers are joined at the ravine part of the wave-shaped filter paper so that a plurality of filter tubes is formed between the two belt-shaped filter papers. Then, one end of each filter tube is flattened to be connected and closed. Thus, a plurality of filter tubes is formed between the two belt-shaped filter papers. This condition is shown in FIG. 4. The wave-shaped filter paper 201 and the flat filter paper 202 are joined at an end of the ravine part 203 to form the filter tube 208. At the farthest end side of the filter paper in the drawing sheet, the mountain part 204 is flattened and the wave-shaped filter paper 201 and the flat filter paper 202 are joined to close this filter tube 208. This condition is referred to as a belt-shaped body 200.

Next, in step 3, belt-shaped bodies are stacked. Here, the belt-shaped bodies 200 are wrapped around in a hollow tubular form and stacked to form a pre-assembled body 300 shown in FIG. 5. During the step of stacking belt-shaped bodies 200, the interior of ravine part 203 at the opening side of filter tube 208 is filled with an adhesive agent while joining it with the adjacent belt-shaped body 200. It must be noted here that a hot melt adhesive is used in joining the filter papers and the belt-shaped bodies. As a result, the plurality of filter tubes 208 opens towards one end part of the flat pre-assembled body 300 and a space between adjacent belt-shaped bodies 200 opens towards the other end part. It must be noted here that adhesives 301, 302 fill up the ramps between the ends of the belt-shaped bodies 200.

Figure 6:
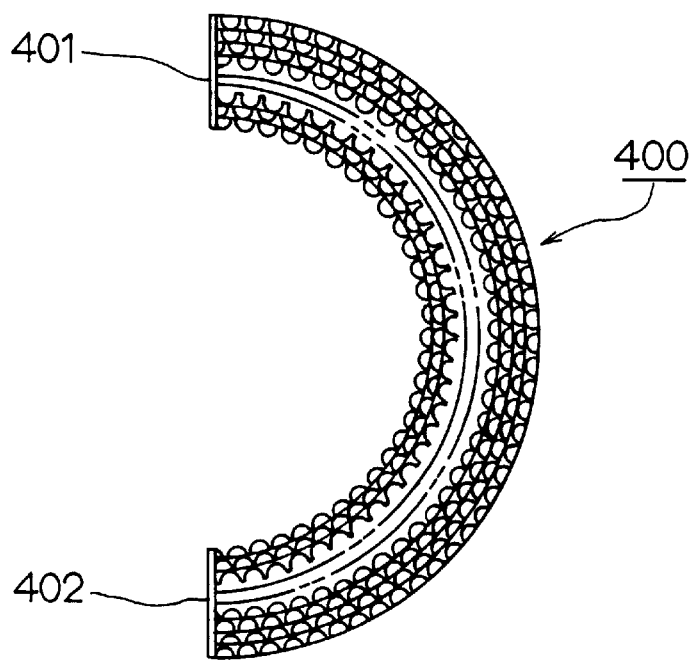
FIG. 6 is a plan view of an upper end of the filter element of the first embodiment.

In step 4, the tubular pre-assembled body 300 is cut in half and filter papers 401, 402 are bonded to close the cut-off surface to derive filter element 400 shown in FIG. 6. This filter element 400 has a hollow, tubular part at its center and has what can be called as a semicircular shape or a C-shape. While the outer periphery of the filter element 400 is shaped as the circumference of a circle, a part of the filter element 400 has a discontinuous part. As seen from the center of the filter element 400, this discontinuous part is an opening which extends over 180°. Accordingly, two filter elements 400 can be derived from one pre-assembled body 300.

In step 5, an adhesive is applied to the outer periphery of the filter element 400, and the element is press-inserted as the filter element 124 into the lower housing 126. At the same time, the space between the filter element 124 and the lower housing 126 is sealed by the adhesive agent. Thus, the inlet and the outlet are formed at both ends of the filter element 400.

In this way, the filter element 400 having a circular outer periphery which has a discontinuous part at one portion is derived by slicing the tubular pre-assembled body 300. In particular, in the present embodiment, due to its honeycomb shape, the filter element can be suitably sliced when a slicing process is introduced because its sliced surface will not be crushed or be deformed.

Hereinafter, the filter element of a second embodiment is described. This embodiment employs different methods for step 3 and subsequent steps shown in FIG. 3.

Figure 7:
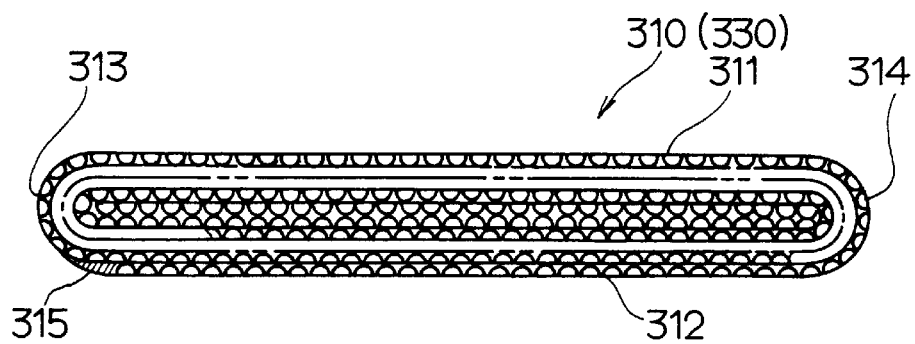
FIG. 7 is a plan view of the upper end of the pre-assembled body of a second embodiment.

First, in step 3, belt-shaped bodies 200 are folded at both ends of an imaginary stacking standard surface to wrap both surfaces of the standard surface to form a flat board-shaped pre-assembled body 310 as shown in FIG. 7. The adhesive agent is used in the same way as the above during the stacking process of the belt-shaped bodies 200. The outer periphery of the pre-assembled body 310 includes flat board parts 311, 312 which are parallel with each other and curved parts 313, 314. It must be noted here that an adhesive 315 shown in FIG. 7 is for decreasing a level difference in the end terminal of the belt-shaped body 200.

Figure 8:
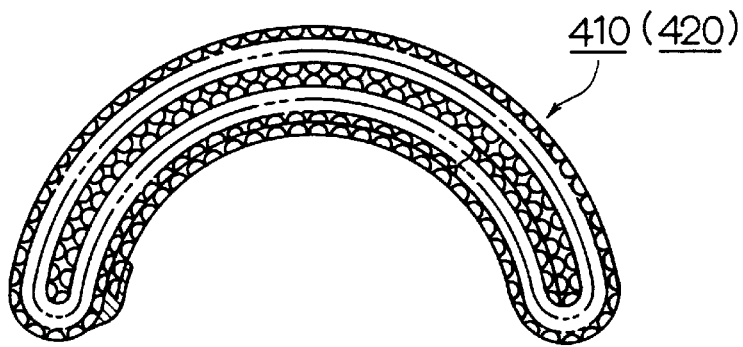
FIG. 8 is a plan view of the upper end of the filter element of the second embodiment.

In step 4, the pre-assembled body 310 is processed to form a discontinuous part and as result, the filter element 410 having a circular outer periphery and a discontinuous part is derived. Here, before the adhesive agent applied in the previous step hardens, the pre-assembled body 310 is bent to have a semicircular shape as shown in FIG. 8 with enough pressure without crushing the filter tube 208. Afterwards, because of cooling and hardening of hot melt adhesive, the filter element 410 which can maintain the shape shown in FIG. 8 is produced. It must be noted here that the shape of the filter element can be changed by heating and softening the adhesive.

Figure 9:
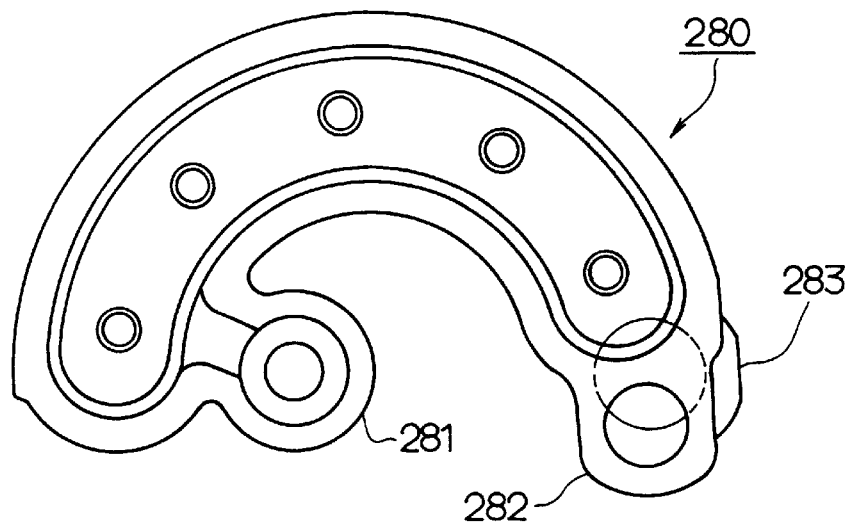
FIG. 9 is a plan view of an upper end of a lower housing which shows the shape of the fuel filter housing of the second embodiment.

Next, in step 5, in the same way as above, the filter element 410 whose outer periphery is applied with an adhesive agent is installed in the lower housing. A vessel-like lower housing 280 shown in FIG. 9 is used in this second embodiment. It must be noted here that a connection part 281 is for connection with the fuel pump, route part 282 is for a passage to the connector pipe 132 provided in the cover 104, and a connection part 283 is for connection with the pressure regulator.

According to this second embodiment, the filter element 410 which has a circular outer periphery and a discontinuous part at one portion can be derived without the slicing process. In particular, in the present embodiment, because the filter element has a honeycomb shape, there will be hardly any deformations in the filter tube and there will be approximately no decrease in the filter area even if a step for changing shapes is introduced after stacking.

A filter element according to a third embodiment is described hereinafter. This embodiment employs different methods for step 3 and subsequent steps shown in FIG. 3.

Figure 10:
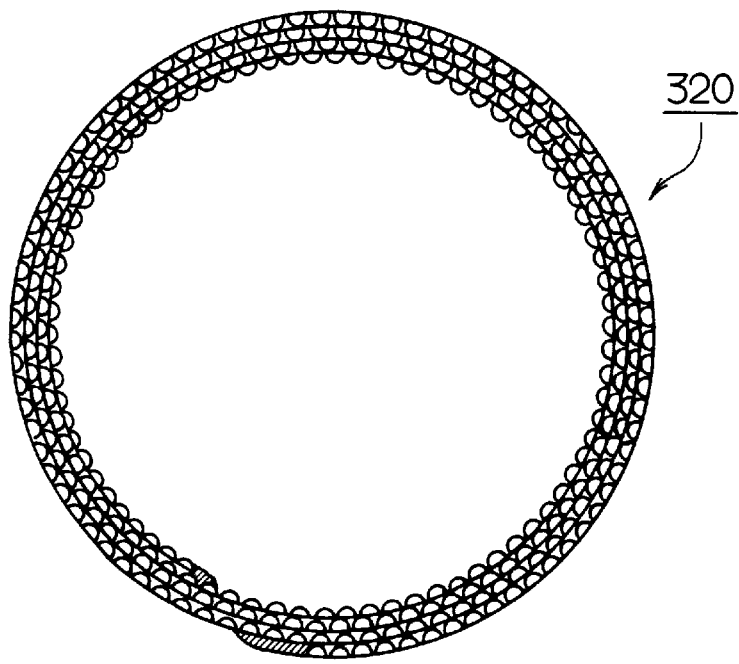
FIG. 10 is a plan view of an upper part of the pre-assembled body of a third embodiment.

First, in step 3, the belt-shaped bodies 200 are wrapped around end stacked to form the slender tube shown in FIG. 10 to produce a pre-assembled body 320.

In step 4, a half of the pre-assembled body 320 is deformed so that it is oriented inward to derive the filter element 420 having the shape shown in FIG. 8. It is desirable that this deformation step is performed with the application of heat to soften the adhesive. Then, the inner surfaces are applied with an adhesive, thus closing all the ravine parts which face inwardly.

In step 5, in the same way as the above, the adhesive is applied in the outer periphery of the filter element 420 and it is inserted into the lower housing 280 having the shape shown in FIG. 9.

Next, the filter element of a fourth embodiment is explained. In this embodiment, the pre-assembled body 330 shown in FIG. 7 is derived using the manufacturing process of the second embodiment. Then, without going through the bending process of step 4, the pre-assembled body 330 shaped as shown in FIG. 7 is fashioned and installed in the interior of the lower housing 280 shown in FIG. 9. It must be noted here that it is desirable to apply heat to the pre-assembled body 330 during the installation process.

Figure 11:
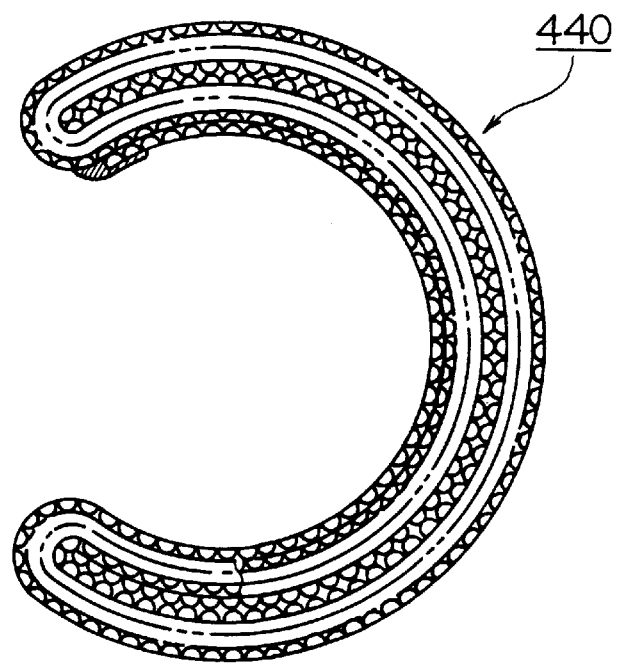
FIG. 11 is a plan view of an upper part of a variation of the filter element.

It must be noted here that while an arc-shaped filter which extends over approximately 180° is constructed in the above-described embodiments, a filter which, as shown in FIG. 11, extends over about 270° can also be formed. Filter element 440 of FIG. 11 can be constructed using the manufacturing process of the second embodiment.

Figure 12:
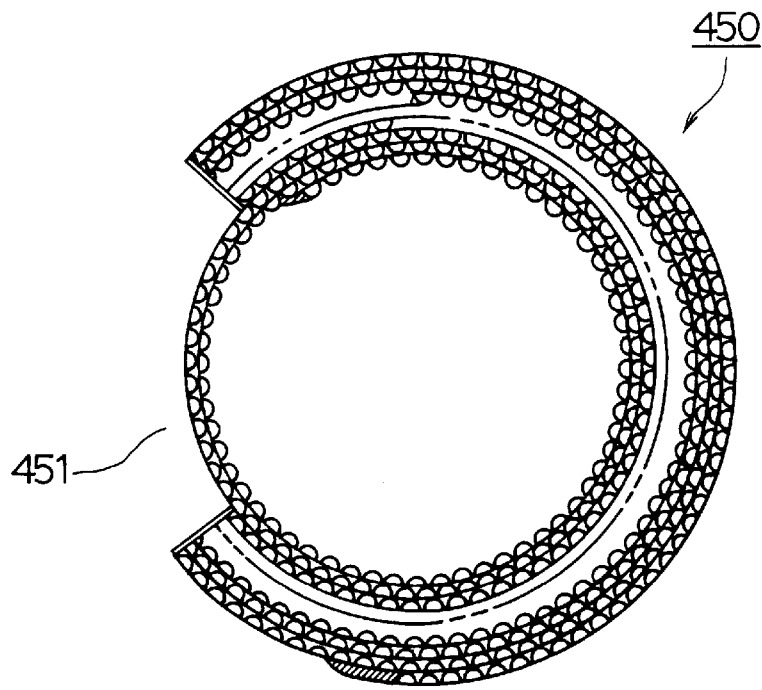
FIG. 12 is a plan view of the upper part of another variation of the filter element.

Moreover, the discontinuous part formed at one part along the peripheral direction of the filter element can also be formed by slicing off several layers of belt-shaped bodies from the outside as shown in FIG. 12. The filter element 450 of FIG. 12 can be made by applying the filter element manufacturing method of the first embodiment. It must be noted here that when using the filter element 450, the filter housing should have a perfectly circular container having a concavity which corresponds to the concavity 451 of the filter element 450. Components such as the electrical connector, fuel level gauge and the like will be housed in such concavity. Also, it must be noted that the concavity can be formed by a slice along a chord in the peripheral direction.

Figure 13:
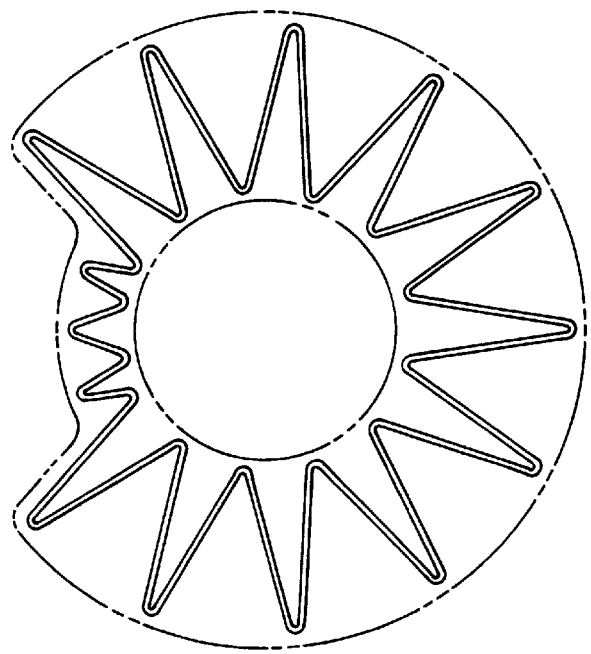
FIG. 13 is a plan view of the upper part of still another variation of the filter element.

In addition, while a honeycomb-shaped (like those found in corrugated cardboards) filter element is used in the above embodiments, a fuel filter having a discontinuous part along its outer periphery can also be formed using a pleated type element shown in FIG. 13. Here, the filter paper is placed in one portion of the circular area to have a first projection dimension in the radial direction with the projection parts in the remaining portion being set to a lower dimension than the first, and thus, the discontinuous part is formed by forming concavities which curve inward from the outer periphery.

Figure 5:
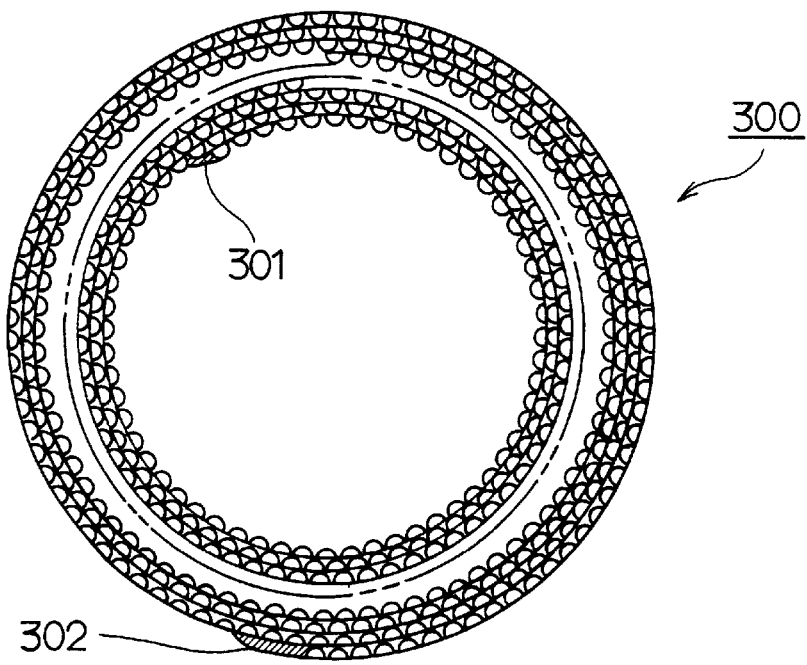
FIG. 5 is a plan view of an upper end of the pre-assembled body of the first embodiment.

Also, a filter element having a concavity and shaped nearly in the same way as that shown in FIG. 12 can also be formed by inwardly crushing from the outside one part of the pre-assembled body 300 shown in FIG. 5 which is formed to have a perfect circular shape.

Also, aside from the pleated type element, an element formed by stacking belt-shaped filter papers after folding them in half in the longitudinal direction can also be used.

In the above embodiments, it must be noted that while the fuel filter and other internal components of the fuel tank have been integrated in the outer periphery of the fuel pump using the fuel filter which has a discontinuous portion along its outer periphery, the fuel filters of the first and second embodiments which have substantially semicircular shapes can be attached without protruding from a wall surface, which is the installation surface of the fuel filter, by orienting the discontinuous portion towards the wall surface direction.

While the above embodiments give detailed descriptions of the fuel filter, the filter of the present invention as well as its manufacturing method can be used in a wide variety of applications as gas filters, liquid filters or the like.

INDUSTRIAL APPLICABILITY

As described above, the formation of a discontinuous part in one portion of an outer periphery of a filter enables the placement of other components in such discontinuous part, and as a result, the flexibility for installing the filter can be enhanced. In particular, for the fuel filter installed inside a fuel tank, because other components installed inside the fuel tank can be placed in the discontinuous part, more components can be highly integrated and installed inside the fuel tank.

We claim:

1. A pervious paper filter for filtering fuel and a fuel pump located therein, said filter and pump assembly being adapted to be disposed in a fuel tank and comprising:

a pervious paper filter element including a smooth outer peripheral surface comprising one continuous arc of at least 180°, said filter element having a liquid inlet surface and a liquid outlet surface, wherein said smooth outer peripheral surface is shaped as a circular continuous arc from one end to another end and having an angle of less than 360° between ends of the outer peripheral surface, and an inner cavity having said fuel pump located therein.

2. A filter for filtering liquids as in claim 1 wherein said outer peripheral surface is at least partly circular and includes only one concavity.

3. A filter as in claim 2, wherein said filter is a ring and said concavity is oriented inward from an outer peripheral surface of said ring.

4. A filter as in claim 2 wherein said concavity is an opening of said outer peripheral surface of said filter element.

5. A filter as in claim 4, wherein said filter includes filter material formed in a partial ring with said opening at one peripheral part of said filter.

6. A filter as in claim 5, wherein said filter includes a plurality of layers of stacked filter material.

7. A filter as in claim 1, including a fuel filter housing having an arcuate C-shaped cross section
wherein said filter is disposed in said housing as a fuel filter for filtering fuel.

8. A filter as in claim 1, wherein said filter includes a plurality of layers of filter material stacked in a radial direction of said filter.

9. A filter as in claim 1 wherein:
said liquid inlet surface and said liquid outlet surface are provided at axial ends of said outer peripheral surface.

10. A filter as in claim 9 wherein:
said filter element further includes an inner peripheral surface shaped as an arc.

11. A filter for filtering liquids, said filter comprising:
a filter element including an outer peripheral surface,
a liquid inlet surface and a liquid outlet surface,
said outer peripheral surface being shaped as an arc from one end to another end and having an angle of less than 360° between ends of the outer peripheral surface,
a fuel filter housing having an arcuate C-shaped cross section, said filter being disposed in said housing as a fuel filter for filtering fuel flowing longitudinally along channels formed in the filter element;
a fuel pump disposed between circumferential ends of the C-shaped housing;
said outer peripheral surface extending axially and circumferentially, and
said filter element having a central opening at a radial center thereof for receiving said fuel pump therein.

12. A filter for filtering liquids and a liquid pump located therewithin, said filter and pump assembly comprising:
a filter element including an outer peripheral surface,
said filter element having a liquid inlet surface and a liquid outlet surface transverse to linear liquid flow channels formed within the filter element;
said outer peripheral surface being shaped as an arc from one end to another end and having an angle of less than 360° between ends of the outer peripheral surface,
said liquid inlet surface and said liquid outlet surface being provided at axial ends of said outer peripheral surface;
said filter element further including an inner peripheral surface shaped as an arc; and
said inner peripheral surface defining a central opening extending axially of said flow channels, wherein a fuel pump is disposed in said central opening.

13. A filter for filtering liquids and a liquid pump located therewithin, said filter and pump assembly comprising:

a filter element having stacked bands of filtering material occupying a partial right-circular cylindrical volume extending circumferentially and radially along a longitudinal axis and having an omitted, circumferentially, radially and axially-extending open portion which thereby provides an opening in a cross-section across the cylinder longitudinal axis, a housing having a fluid inlet and a fluid outlet to a cavity that also has a cross-section shaped and sized similarly to the filter element so as to slidingly accept said filter element thereto and to provide liquid flow through the filter element that is parallel to said longitudinal axis; and a liquid pump disposed within an open portion of the housing, wherein a top portion of the housing is adapted to close a fuel tank opening and supports the filter and pump assembly within a fuel tank.

14. A filter as in claim 13 wherein said filter element comprises stacked layers of filter material including material having axially extending corrugations.

15. A filter for filtering liquids, said filter comprising:
a filter element occupying a partial right-circular cylindrical volume extending circumferentially and radially along a longitudinal axis and having an arcuate C-shaped cross-section with an omitted, circumferentially, radially and axially-extending open portion which thereby provides an opening in a cross-section across the cylinder longitudinal axis, a housing having a fluid inlet and a fluid outlet to a cavity that also has an arcuate C-shaped cross-section shaped and sized to accept said filter element thereto;

a fuel pump being disposed between circumferential ends of the C-shaped housing;

wherein said filter element comprises stacked layers of filter material including material having axially extending corrugations; and wherein axially-extending interstices between stacked layers of corrugations are sealed to prevent fluid flow therealong.

16. A filter as in claim 15 wherein all said corrugations are closed at one axial end thereof.

17. A filter as in claim 15 wherein said filter element includes a cut-off half-portion of a full cylindrical filter structure having cut-ends that are sealed with additional material.

18. A filter for filtering liquids, said filter comprising:
a filter element occupying a partial right-circular cylindrical volume extending circumferentially and radially along a longitudinal axis and having an omitted, circumferentially, radially and axially-extending open portion which thereby provides an opening in a cross-section across the cylinder longitudinal axis, a housing having a fluid inlet and a fluid outlet to a cavity that also has a cross-section shaped and sized to accept said filter element thereto;

wherein said filter element comprises stacked layers of belt-type corrugated filter material having axially extending corrugations; and wherein said stacked layers are arranged as a contiguous spiral winding of said belt-type corrugated filter material.

19. A filter as in claim 18 wherein said stacked layers include a radially ramped axially-extending and circumferentially-extending seal at terminating ends of the wound belt-type filter material.

20. A filter as in claim 18 wherein said filter element layers are contiguously wound layers of belt-type corrugated filter material having an arcuate cross-sectional shape.

21. A filter as in claim 18 wherein said filter element occupies a cylindrical volume of filter material except for a reduced radial thickness within an arcuate axially extending portion thereby forming a arcuate open recess at an outer peripheral portion of the filter element.

22. A liquid fuel paper filter element shaped to accommodate an encompassed fuel pump, said paper filter element comprising:

a continuous length of paper filter belt wrapped about an axis in a plurality of contiguous stacked layers to form a filter element having a C-shaped cross-section, said belt having multiple layers including axially extending channels formed by corrugations in at least one layer;

said channels being open at one end and closed at the other end;

interstices between the stacked layers of the belt being sealed to prevent liquid passage therethrough;

said filter element being shaped to have an outer convex peripheral surface that conforms to at least part of a cylinder and an inner concave peripheral surface that conforms to at least part of another smaller diameter cylinder.

23. A liquid fuel filter element for filtering fuel while spatially accommodating co-located functional fuel system components within an arcuate cavity thereof, said fuel filter element comprising:

a plurality of stacked corrugated and non-corrugated layers of filter material having a C-shaped cross-section defining an arcuate cavity bounded by a non-corrugated layer thereof.

24. A fuel filter element as in claim 23 wherein said stacked layers comprise a continuous winding of a belt-like filter material which includes a corrugated layer affixed to a non-corrugated layer.

25. A fuel filter element as in claim 23 comprising corrugation-layer defined fuel passage channels disposed longitudinally transverse to said arcuate C-shaped cross-section of the filter element.

26. A filter element as in claim 25 wherein said fluid passage channels are sealed at one longitudinal end of the filter element.

27. A pervious paper liquid fuel filter element for filtering fuel while spatially accommodating a fuel pump within an arcuate cavity thereof, said fuel filter element comprising:

a plurality of corrugated and non-corrugated layers of pervious filter paper stacked and shaped to provide axially directed fuel flow passages in a longitudinal direction and an arcuate cavity within a transverse C-shaped cross-section of the stacked layers.

28. A fuel filter element as in claim 27 wherein said stacked layers comprise a continuous winding of filter material which includes a corrugated layer adjacent a non-corrugated layer which non-corrugated layer includes a portion thereof disposed on an outside of said winding.

29. A fuel filter element as in claim 28 wherein said continuous winding comprises an arcuate C-shaped cross-section.

30. A filter element as in claim 27 wherein said fuel flow passages are sealed at one longitudinal end of the filter element.

\* \* \* \* \*